Dec. 20, 1932.  E. B. WILLIAMS  1,891,856
GYROSCOPIC INSTRUMENT
Filed Aug. 29, 1929   3 Sheets-Sheet 1

Eugene B. Williams
INVENTOR
BY Victor J. Evans
ATTORNEY

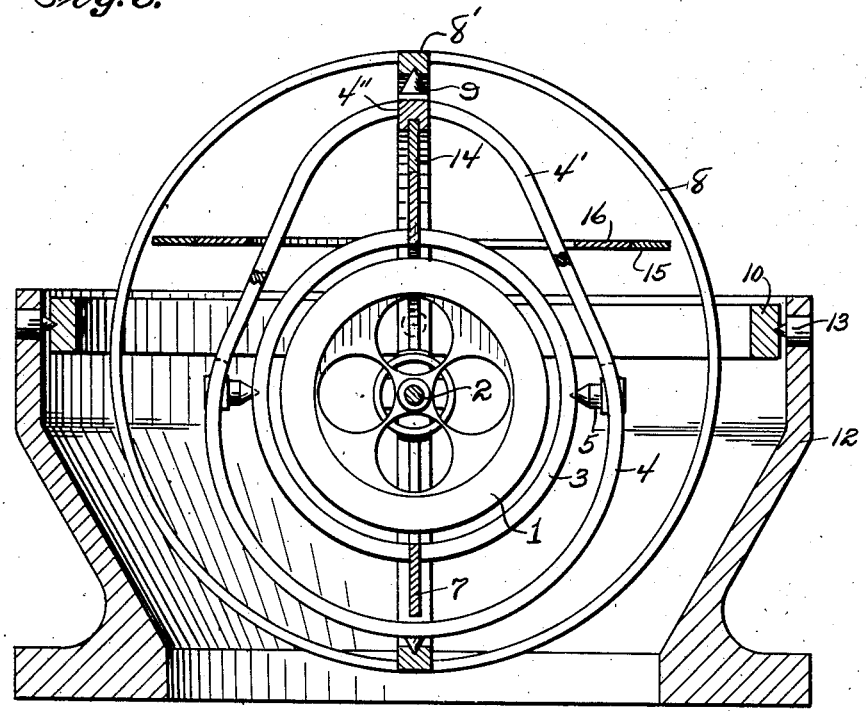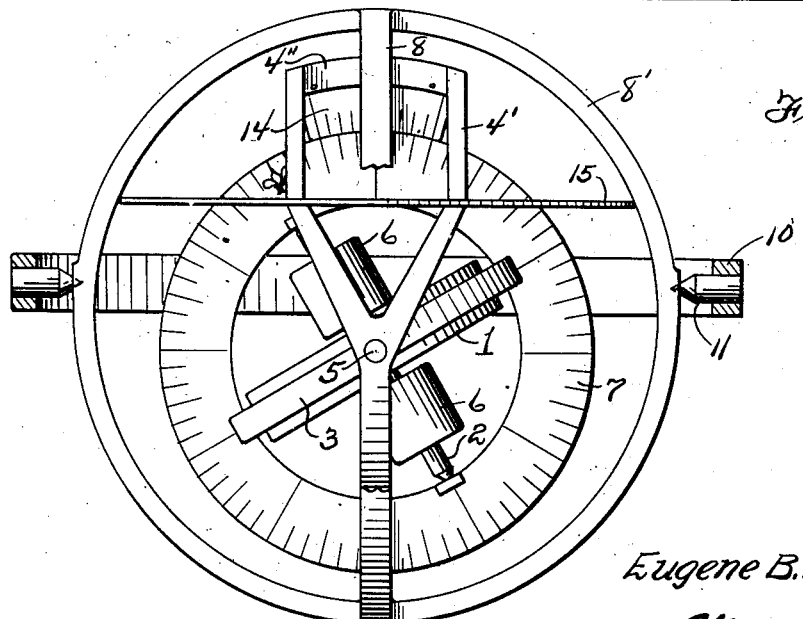

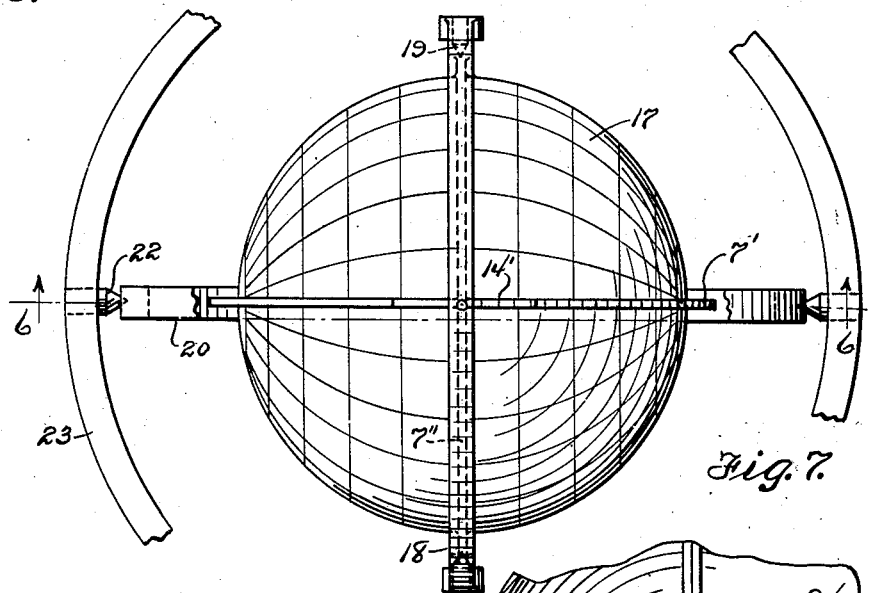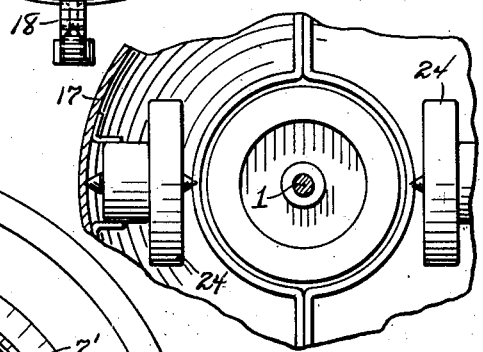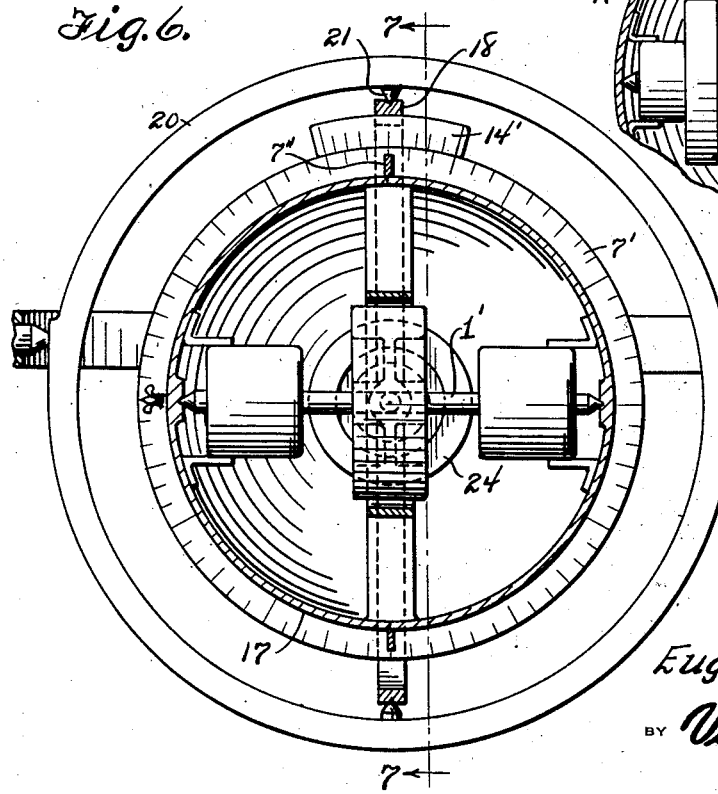

UNITED STATES PATENT OFFICE

EUGENE B. WILLIAMS, OF FORT PIERCE, FLORIDA

GYROSCOPIC INSTRUMENT

Application filed August 29, 1929. Serial No. 389,268.

This invention relates to a gyroscopic instrument, the general object of the invention being to provide an instrument for determining degrees of latitude and longitude, and time or can be used for any one of these purposes, and the invention comprises a gyroscope mounted to have freedom of motion in all directions and having associated therewith an indicating member and a member carrying a vernier or the like which is held perpendicularly to the earth's center by gravity, whereby the vernier or other indicating member will move relative to the other indicating member carried by the gyroscope and thus indicate the relative movements of the two members.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 3 is a section on line 3—3 of Figure 2.

Figure 4 is an elevation, with parts broken away, with the supporting member omitted and showing the parts in a different position.

Figure 5 is a plan view with parts broken away, showing a modification.

Figure 6 is a section on line 6—6 of Figure 5.

Figure 7 is a section on line 7—7 of Figure 6.

Figure 1:
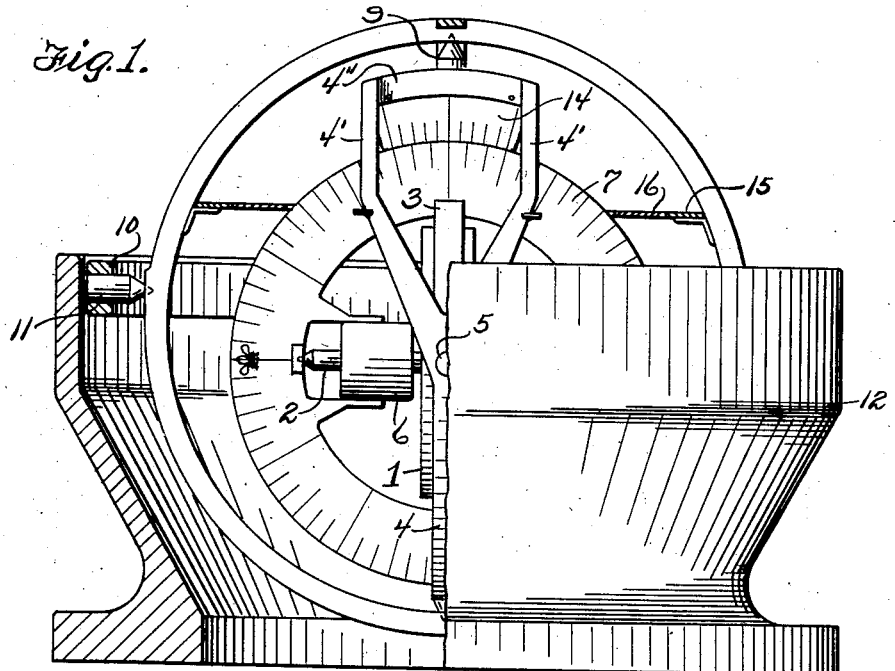
Figure 1 is an elevation, with parts broken away, of the improved device.
Figure 2:
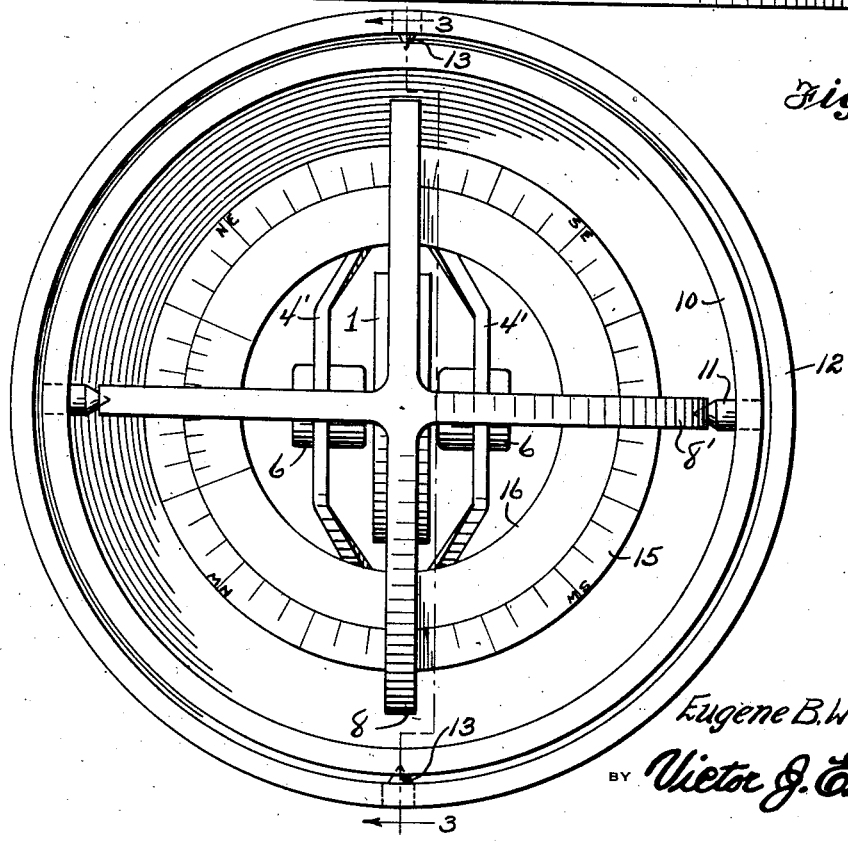
Figure 2 is a top plan view thereof.

Referring to Figures 1 to 4, the numeral 1 indicates the wheel of the gyroscope, and the numeral 2 its axle, the wheel being enclosed in a case 3 which is supported to have movement about a horizontal axis in a substantially oval frame 4 through means of the pivots 5 carried by the frame. The gyroscope is driven by the motors 6 and while the drawings show two motors, it will, of course, be understood that it can be driven by one or more motors. A ring-shaped dial 7 is attached to the casing 3 and the ends of the shaft or axle 2 are journaled in portions of the inner circumference of said dial and the motors are supported by portions of said dial, it being seen that the dial is arranged at right angles to the wheel and its casing.

The frame 4 is pivoted in a ring 8 to move about a vertical axis through means of the pivots 9 carried by the frame and engaging portions of the ring 8 and a second ring 8' is formed with the ring 8 and extends at right angles thereto, with the rings connected together at their vertical axes. The ring 8' is pivotally supported in a horizontal ring 10 to move about a horizontal axis through means of the pivots 11 carried by the ring 10 and engaging portions of the ring 8' above the horizontal center of said ring 8' so that the parts supported by the ring 10 will remain in a certain position under the action of gravity. The ring 10 is pivoted to a supporting member 12 to move about a horizontal axis through means of the pivots 13 carried by the member 12 and engaging portions of the ring 10. The frame 4, at its upper part, is composed of two spaced portions 4' which are connected together by the cross piece 4" and this cross piece carries the upper pivot 9. A vernier 14 is suspended from the cross piece, with its lower edge adjacent the scale 7.

A lubber ring 15 is carried by the rings 8 and 8' and cooperates with a compass ring 16 carried by the frame 4, these parts being for convenience in orienting the instrument.

From the foregoing it will be seen that the gyroscope and its index ring or dial 7 has freedom of movement in all directions and that the frame 4 will hold the vernier perpendicularly under the action of gravity, and as the gyroscope will remain in the position in which it has been set, the vernier will indicate on the dial 7 changes in the position of the parts, due to the travel of a ship or aeroplane or other craft on which the device is placed. For instance, if the instrument is set so that the axis of rotation of the gyroscope points due north at the equator, then as the instrument is carried in a northerly direction, the axis of rotation remains fixed in space and apparently begins to tilt so that the axis pointing north gradually points in an upward direction, and if carried to the North Pole, will point straight up. It is this variation from the equator to the North Pole that will determine the exact location of the instrument and readings on the vernier or other device and in that way a ship or aeroplane can determine how far north of the equator it has been carried, by the indicator point. Likewise if the instrument is set so that the axis of rotation of the gyroscope points due east at any given meridian, it will continue this axis of rotation suspended in space, but the diurnal movement of the earth will apparently cause it to completely revolve every twenty-four hours, so that proper corrective readings should be made or mechanical corrective devices may be installed on the instrument, as for instance, the indicator ring or point of the instrument may be so arranged that it can be rotated against the diurnal movement of the earth, causing it to apparently stand still and continue to point to the same place on the vernier; then if the instrument is carried in an easterly or westerly direction from the meridian point where it is set, the indicator will designate the degrees of longitude that the instrument is carried east or west from the starting point.

As is well known, a gyroscope suspended in space continues its axis of rotation fixed in space, so that if the instrument is started with the axis of its rotation pointing north, it will maintain that direction unless acted upon by some ulterior angular force.

The device can be made to orient itself and thereby find north or east or other points of the compass by attaching a weight to the instrument case, so that said weight acts as an ulterior angular force, causing torque and precession, and when a weight is used with the device, the device will act as a compass.

The orienting of the instrument is necessary in that the axis of the gyroscope must be pointed north and south for the purpose of determining degrees of latitude, and likewise pointed east and west for the purpose of determining degrees of longitude, when the instrument is moved from place to place, as by a moving ship or aeroplane. The instrument, when properly oriented and set, will likewise determine sidereal time, by reason of the fact that the axis of the gyroscope remains fixed in space, while the diurnal movement of the earth apparently causes it to rotate once in twenty-four hours.

In the modification shown in Figures 5, 6 and 7, the gyroscope is placed in a sphere 17 which is graduated to represent the earth and this sphere carries the scale ring 7' and an equatorial ring 7'', these rings being arranged at right angles to each other, and the sphere is pivotally supported in a ring 18 by the pivots 19. The ring 18 is pivotally supported in a ring 20 by the pivots 21 carried by the ring 20 and engaging portions of the ring 18. The vernier 14' is attached to the ring 18 and cooperates with the dial ring 7'. The ring 20 is pivotally supported above its center by the pivots 22 carried by the ring 23 which is pivoted in a support, as in the first form of the invention. A pair of motor driven gyroscopes 24 is also arranged in the sphere, with their axes extending at right angles to the axes of the first gyroscope, shown generally at 1', these gyroscopes 24 holding the sphere motionless in an east-west direction and the gyroscope 1' holding the parts motionless in a north-south direction. The equatorial ring 7'' may be marked as a vernier and the ring 7' may be marked with longitudinal markings. In other respects, this modification is similar to the first form of the invention and operates in the same manner.

The invention is based upon the principle that a gyroscope so mounted as to have freedom of motion around three rectangular axes will maintain its axis of rotation fixed in space, until acted upon by some externally impressed angular force.

Obviously, the style of indicator may vary, such as a pointing arrow or needle, etc., or the segment of a circle, or otherwise, but in the drawings, a complete disk or circular flat ring is used.

It is also obvious that the instrument may be floated or a variety of bearings may be chosen instead of the pivot rings shown in the drawings, and instead of the horizontal ring shown to indicate compass bearings, other means can be used.

Also, to more easily determine degrees of longitude, the indicator ring might be revolved by an accurate chronometer once in twenty-four hours in order to synchronize with the diurnal movement of the earth. This, however, has been omitted in the accompanying drawings for the sake of simplicity.

Since such an instrument, when installed on a moving ship, might be acted upon by the diurnal motion of the earth, combined with the ship's motion, depending upon the course and speed of the ship, mechanical correction devices may be desirable to be attached, or such corrections may be taken from charts or tables, especially prepared for such purpose.

It is also obvious that such an instrument, so placed and used as to indicate degrees of longitude, will also, if properly marked, be an absolute chronometer by reason of indicating the accurate diurnal movement of the earth.

It is also obvious that separate instruments may be installed for the purpose of determining (a) latitude, (b) longitude, (c) time; and it is believed that a separate instrument for each purpose will be more advisable, as avoiding complicated machinery. It is also equally obvious, as demonstrated in practical use in the gyroscope compass, that by applying a detachable weight to the case containing the gyroscope, this instrument can be made to orient itself.

It is equally obvious that the sensitive element of the instrument, when placed in a hollow globe, as in Figures 5, 6 and 7, may be floated in a suitable substance, such as, for instance, mercury or alcohol, instead of being hung in bearings, such as the gimbal rings shown. This globe may have markings of both latitude and longitude, which may be read by means of the verniers, etc., placed north and south and east and west or a needle indicator or other suitable register may be used.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A gyroscopic instrument including a support and a motor driven gyroscope having a ring-shaped dial, a substantially oval-shaped frame positioned about the gyroscope and having a pair of spaced members, means pivoting the gyroscope to the frame for movement about a horizontal axis, a pair of rings arranged at right angles to each other and secured together and positioned about the frame, means pivoting the frame to said rings for movement about a vertical axis, an annular supporting member pivoted to the support for movement about a horizontal axis and located in a plane above the pivots between the gyroscope and the frame, means pivoting the annular member to said rings for movement about a horizontal axis, a cross piece connecting the members of the frame, a vernier suspended from the cross piece and associated with the ring-shaped dial, a lubber ring carried by said first rings, and a compass ring carried by the frame and co-operating with the lubber ring for orienting the device.

In testimony whereof I affix my signature.

EUGENE B. WILLIAMS.